United States Patent [19]
Miller

[11] Patent Number: 5,611,472
[45] Date of Patent: Mar. 18, 1997

[54] BICYCLE RACK FOR PICK-UP TRUCKS

[76] Inventor: Frank Miller, 150 Spatuck Road, East St. Paul, Manitoba, Canada, R2E 0J7

[21] Appl. No.: 533,392

[22] Filed: Sep. 25, 1995

[51] Int. Cl.[6] ................................. B60R 7/00; B60R 9/00
[52] U.S. Cl. ........................ 224/403; 224/402; 224/405; 224/571; 211/22
[58] Field of Search ..................................... 224/924, 571, 224/403, 500, 501, 504, 322, 324, 405, 402; 211/19, 20, 17, 22

[56] References Cited

U.S. PATENT DOCUMENTS

| | | | |
|---|---|---|---|
| 3,912,139 | 10/1975 | Bowman | 224/403 |
| 4,531,774 | 7/1985 | Whatley | 224/404 |
| 4,934,572 | 6/1990 | Bowman et al. | |
| 5,014,890 | 5/1991 | Perry. | |
| 5,037,019 | 8/1991 | Sokn. | |
| 5,092,504 | 3/1992 | Hannes et al. | 224/403 |
| 5,127,564 | 7/1992 | Romero. | |

FOREIGN PATENT DOCUMENTS 2053416  6/1992  Canada.

*Primary Examiner*—Henry J. Recla
*Assistant Examiner*—Kam Shah
*Attorney, Agent, or Firm*—Murray E. Thrift; Adrian D. Battison

[57] ABSTRACT

A bicycle rack is provided for use with trucks having a cargo box particularly of the type for use with a pick-up truck. The bicycle rack can carry a number of bicycles in an upright position in the cargo box of a truck, secures the bicycle without having to part the wheel from the bicycle or use clamps or straps to restrain the bicycle, can carry bicycles of different sizes, and can be adjusted to fit different makes and sizes of trucks. The bicycle rack comprises a cross member, having stakes at each end for fixing it to the side walls of the truck box, and forks for holding one or more bicycles in place.

17 Claims, 3 Drawing Sheets

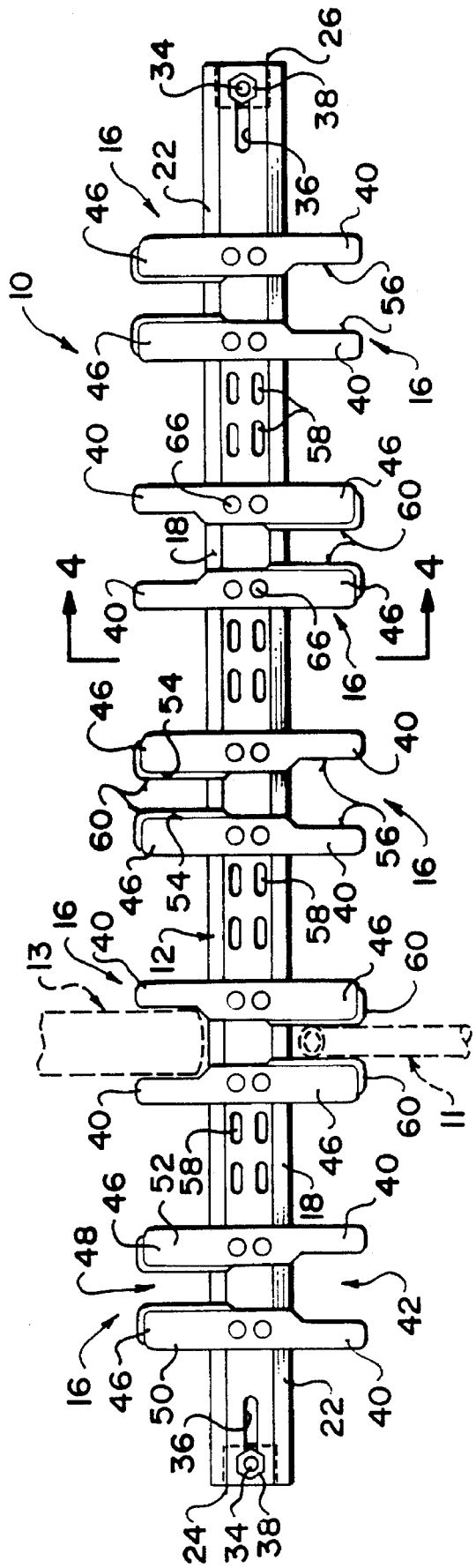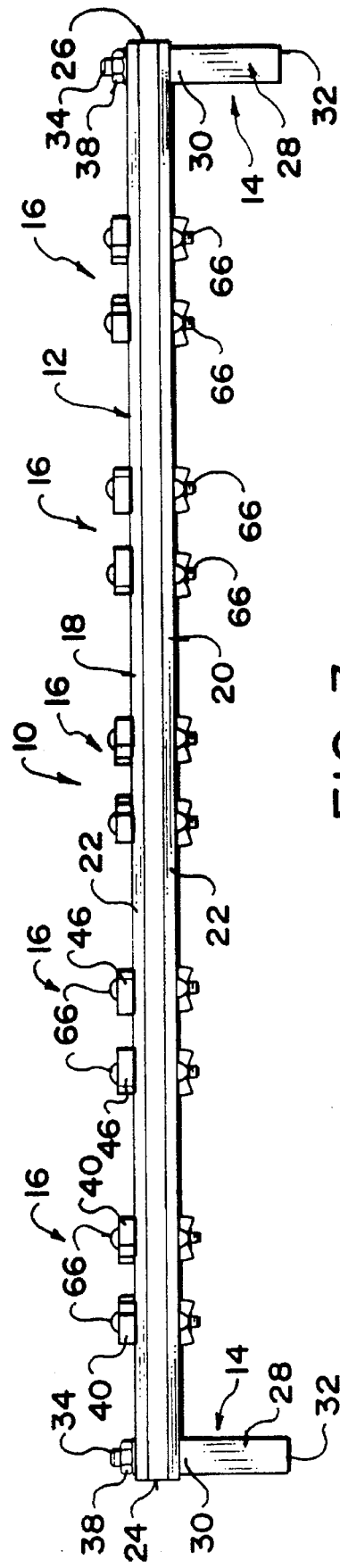

BICYCLE RACK FOR PICK-UP TRUCKS

FIELD OF THE INVENTION

The present invention provides a bicycle rack for use with a truck having a cargo box, particularly of the type for use with a pick-up truck.

BACKGROUND

Bicycling is presently very popular, particularly bicycling cross country and on trails in the country side or in the wilderness. This requires transporting a bicycle or bicycles usually by car or truck to the desired location.

A variety of racks for use in transporting bicycles on cars and trucks are known. One type of currently available bicycle rack mounts the bicycles close together and side by side on the front or back of the car or truck. These racks are usually limited to transporting one to three bicycles at once. The bicycles when mounted on these racks project out from the vehicle where they are easily damaged by minor collisions with each other, and by rocks and other debris. Each bicycle is usually secured to the bicycle rack with straps, and many require the removal of the front wheel of the bicycle. Securing the bicycle with straps and removing the front wheel can be inconvenient and time consuming.

Another common arrangement is to transport the bicycle or bicycles using a roof bicycle rack. These require lifting the bicycle onto the roof of the vehicle which increases the risk of the bicycle being dropped thereby damaging the vehicle and the bicycle. Roof top bicycle racks also usually require the removal of the front tire of the bicycle, and are usually limited to transporting two or three bicycles at once.

Many of these common arrangements are not well suited to use with trucks particularly with pick up trucks. A number of racks have been developed in an attempt to provide a solution for transporting bicycles in the cargo box of a truck without damaging the bicycles or truck. Most of these like the roof top racks require the removal of the front wheel of the bicycle to secure the bicycle in place and hold it upright. Other arrangements have provided clamps which hold the bicycle in place but these clamps are often time consuming to position and lock onto the bicycle.

A bicycle rack for use with a truck is needed which can carry a number of bicycles in an upright position in the cargo box of a truck, which secures the bicycle without removing parts from the bicycle or using clamps or straps to restrain the bicycle, which can carry bicycles of different sizes, which can be adjusted to fit different makes and sizes of trucks, and which is simple in design, and easy to use.

SUMMARY

According to the present invention there is provided a bicycle rack for use with a truck having a cargo box with substantially parallel side walls and a bicycle having a frame, and a tire mounted on front bicycle forks, said bicycle rack comprising:

a cross member adapted to extend between the side walls of the cargo box;

fixing means arranged at each end of the cross member for fixing the cross member to respective side walls of the cargo box;

support means mounted on the cross member defining at least one first slot extending to one side of the cross member for receiving a portion of the bicycle tire, and defining at least one second slot extending to an opposite side of the cross member for receiving a portion of the bicycle frame.

In the preferred embodiment the first slot comprises a first pair of forks extending outwards from the cross member and the second slot comprises a second pair of forks extending outwards from the cross member opposite and aligned with a respective first pair of forks. The first and second pairs of forks are adjustable to accommodate bicycles having tires and frames of various sizes.

The fixing means comprise a stake fixed to each end of the cross member extending downwards therefrom for engagement in a stake hole in a respective one of the parallel truck box side walls. Each stake is adjustably fixed to the cross member to allow for use with different types of vehicles.

The support means are spaced along the cross member and may be arranged with all of the first pairs of forks extending from the cross member in the same direction, or they may be arranged with adjacent first pairs of forks extending from the cross member in opposite directions.

In one possible alternate embodiment the fixing means may comprise clamps for engaging the truck box side walls. Each clamp being adjustably fixed to the cross member such that the clamp means is movable longitudinally along the cross member.

One embodiment of the invention will now be described in conjunction with the accompanying drawings in which:

BRIEF DESCRIPTION OF THE DRAWINGS

FIG. 2 is a top view of the bicycle rack.

FIG. 3 is a front view of the bicycle rack.

In the drawings like characters of reference indicate corresponding parts in the different figures.

DETAILED DESCRIPTION

Figure 1:
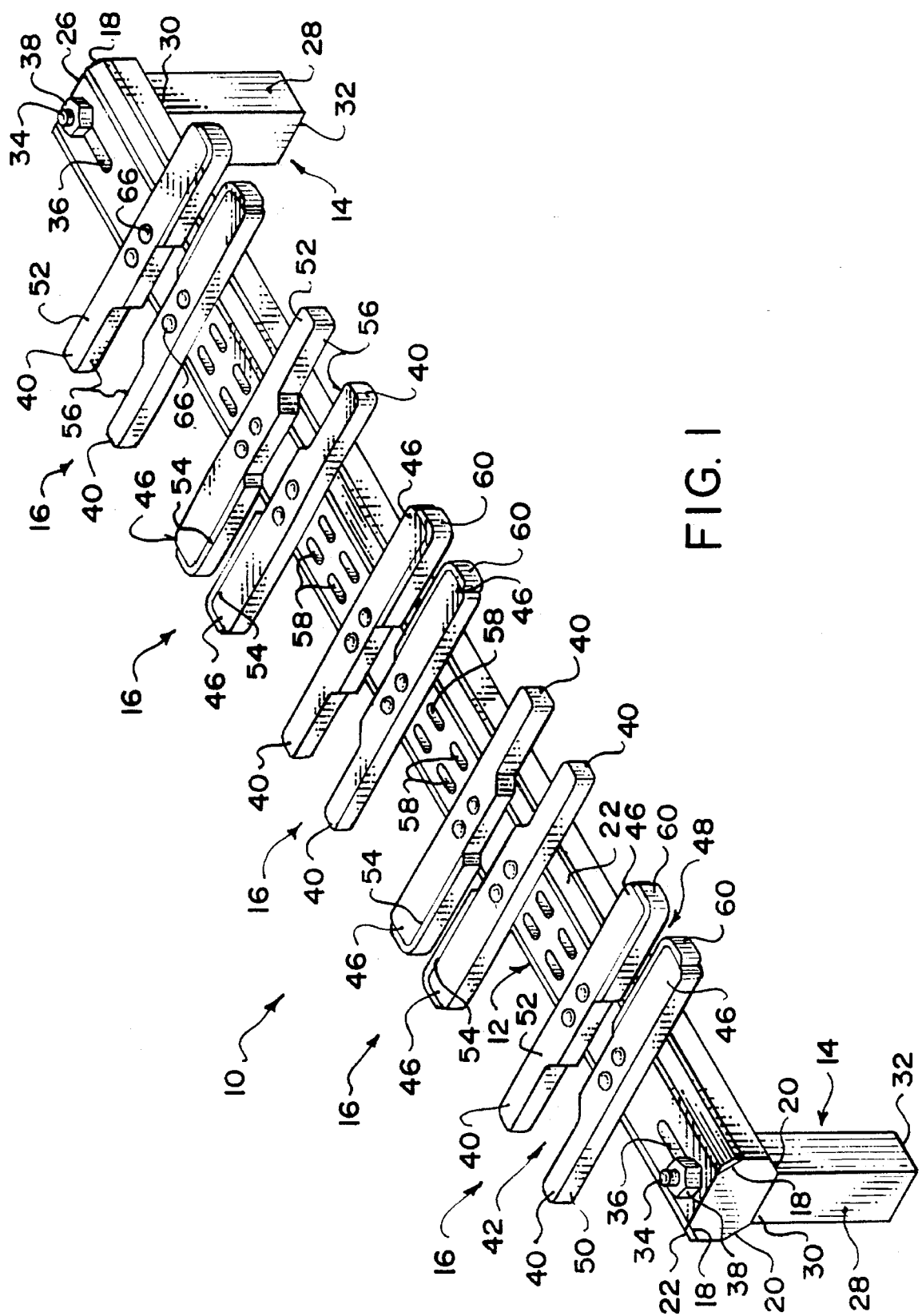
FIG. 1 is an isometric view of the bicycle rack.

Referring to FIGS. 1 and 2 the bicycle rack is shown generally at 10. The bicycle rack 10 is a designed to carry a number of bicycles securely in an upright position in the back of a pickup truck. The bicycle rack 10 holds the bicycle in place by the front tube 11 of the bicycle frame and the front tire 13. The bicycle rack 10 comprises a cross member 12, fixing means 14 at each end of the cross member for fixing the cross member 12 to the side walls of the truck box, and support means 16 for holding one or more bicycles in place.

The cross member 12 is an elongate member adapted to extend between the side walls of the cargo box of a pickup truck, and can be constructed to fit both full sized and compact pickup trucks. The cross member 12 is beveled longitudinally along the length of its top 18 and bottom 20 edges, and has padding 22 extending along each beveled top edge 18. The padding 22 is provided to protect the paint on the front tube 11 of the frame of the bicycle from being chipped or otherwise damaged by the rack 10 and is usually comprised of a resilient rubber material. Any appropriate material which provides sufficient padding may be substituted for the resilient rubber.

Figure 4:
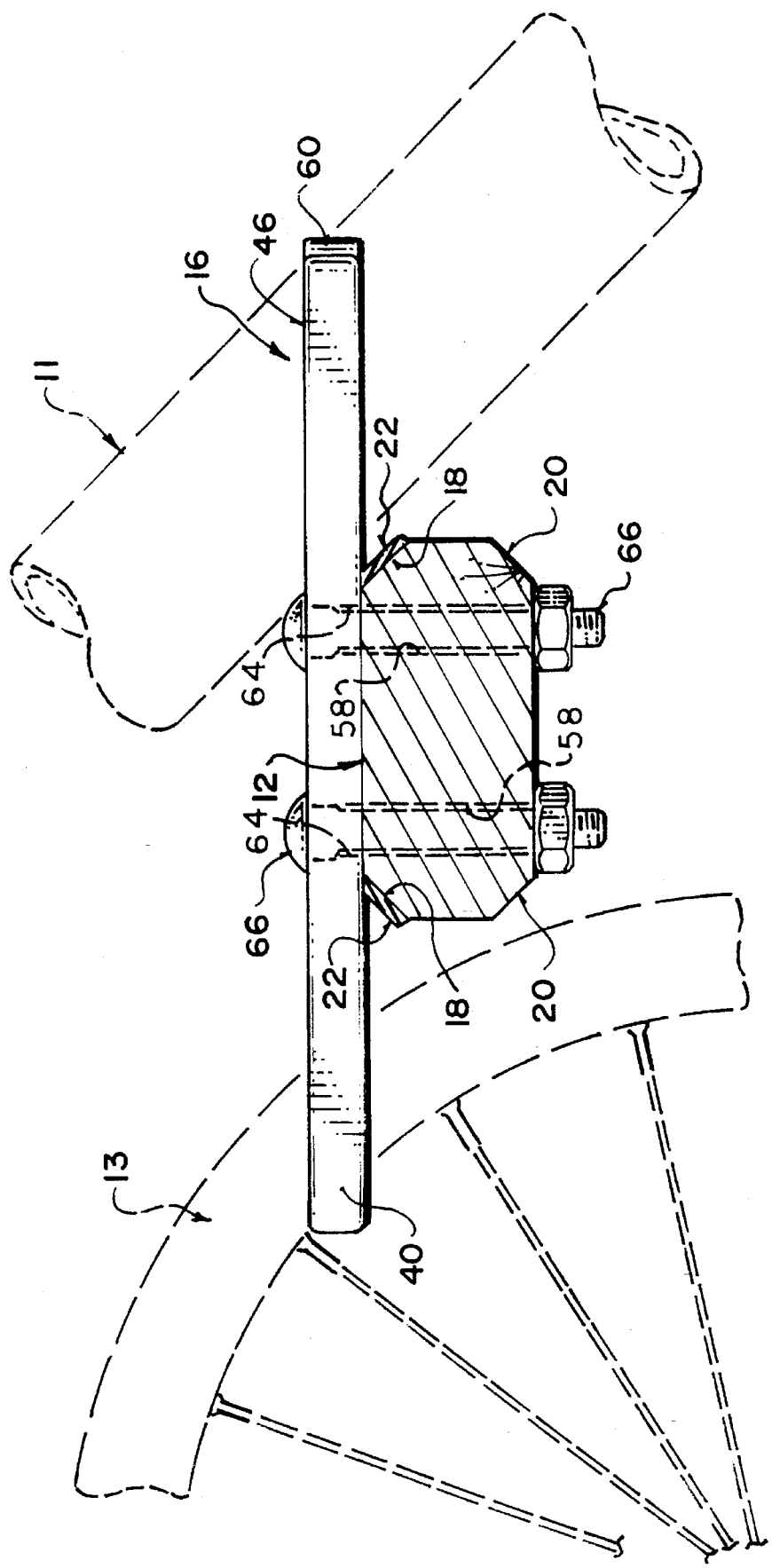
FIG. 4 is a cross sectional side view of the bicycle rack through line A—A.

Referring to FIGS. 2, 3, and 4 the fixing means 14 are arranged at each end 24 and 26 of the cross member 12 to fix the cross member 12 to respective side walls of the cargo box. The fixing means 14 usually comprise a stake 28 fixed at a top end 30 to each end 24 and 26 of the cross member 12 and extending downwards therefrom to a free bottom end 32. Each stake 28 engages a stake hole in a respective truck box side wall and is held in place by an interference fit.

Each stake 28 is adjustably fixed at its top end 30 to the cross member 12 by threaded member 34 and slot 36 arrangement. The threaded member 34 is fixed to the top end 30 of the stake 28 and projects upwards therefrom. A slot 36 is located adjacent each end 24 and 26 of the cross member 12 and extends inwards from the end a distance longitudinally along the cross member 12. A nut 38 fixes the threaded member 34 in place on the cross member 12.

The support means 16 are mounted on the cross member 12 and have a first pair of forks 40 which define a first slot 42 and extend outwards from the cross member to one side of the cross member. The first pair of forks 40 receive a portion of the bicycle tire 13. The support means 16 also include a second pair of forks 46 which define a second slot 48 and extend outwards from the cross member opposite and aligned with a respective first pair of forks 40 for receiving a portion of the bicycle frame 11.

The first and second pairs of forks 40 and 46 comprise a pair of spaced apart elongate members 50 and 52 fastened to the cross member 12, said elongate members 50 and 52 being parallel and a having opposing engagement surfaces 54 and 56 for engaging the bicycle tire 13 and bicycle frame 11.

The pair of elongate members 50 and 52 include adjustment means for adjusting at least one of said pair of elongate members 50 and 52 longitudinally along the cross member 12 to accommodate bicycles having tires and frames of various sizes. Each pair of first forks 40 includes padding 60 on each engagement surface 54. The padding 60 is comprised of resilient rubber material.

The adjustment means comprise pairs of slots 58 spaced apart and extending longitudinally along the cross member 12, a hole 64 in each one of the elongate members 54 and 56 arranged to cooperate with a respective one of the pairs of slots 58, and a removable and reengagable fastener 66 for engaging through the cooperating holes 64 and slots 58.

Referring to FIGS. 1 and 5 the support means 16 are spaced along the cross member 12 and may be arranged with all of the first pairs of forks 40 extending from the cross member 12 in the same direction, or with adjacent first pairs of forks 40 extending from the cross member 12 in opposite directions. The support means 16 usually include three first and second pairs of forks 40 and 46, or five first and second pairs of forks 40 and 46, however different configurations with different numbers of forks may also be used.

In use the bicycle rack 10 can be used to carry a number of bicycles usually three to five, securely in an upright position in the back of a pickup truck. The cross member 12 of the bicycle rack 10 is securely attached to the pickup truck box by the stakes 28 which are attached to the cross member 12. The stakes 28 are inserted in the centre stake holes located on each side of the truck cargo box. With shorter boxes, the rear stake holes can be used with the tailgate down. The stakes 28 can be adjusted to fit the various makes of trucks to accommodate variations in the distance between the stake holes of different makes.

Once the cross member 12 is connected to the truck-box, bicycles can easily be placed in and removed from the bicycle rack 10. The front end of the bicycle is lifted and positioned such that the front wheel 13 of the bicycle lies on one side of the cross member 12 and the sloped front frame tube 11 of the bicycle lies on the side opposite. The bicycle is then lowered such that the sloped front frame tube 11 inserts between the first pair of forks 40 in contact with the padding 60, and the front wheel 13 of the bicycle inserts between the wider second forks 46 to restrict wheel movement. The bicycle can now be transported. The pairs of forks 40 and 46 can be adjusted to fit the front frame tube size of most bicycles. The fit should restrict sideways movement but allow easy removal.

To remove the bicycle lift the front end of the bicycle by the handle bars disengaging the front frame tube 11 from the first pair of forks 40 and the wheel 13 from the second pair of forks 46. The bicycle rack 10 can be removed simply by lifting the cross member 12 thereby pulling the stakes 28 out of the stake holes.

In an alternative arrangement the stakes 28 may be replaced with clamps for engaging the truck box side walls. Each clamp, like the stakes 28, would be adjustably fixed to the cross member 12 such that the clamps are adjustable longitudinally along the cross member 12.

While one embodiment of the present invention has been described in the foregoing, it is to be understood that other embodiments are possible within the scope of the invention. The invention is to be considered limited solely by the scope of the appended claims.

I claim:

1. A bicycle rack for use with a truck having a cargo box with substantially parallel side walls and a bicycle having a frame and a wheel mounted on front bicycle forks, said bicycle rack comprising:

a cross member adapted to extend between the side walls of the cargo box;

fixing means arranged at each end of the cross member for fixing the cross member to respective side walls of the cargo box;

support means mounted on the cross member defining at least one first slot extending to one side of the cross member for receiving a portion of the wheel mounted on the forks of said bicycle, and defining at least one second slot extending to an opposite side of the cross member for receiving a portion of the frame of said bicycle, and wherein the first slot comprises a first pair of forks extending outwards from the cross member, and wherein the second slot comprises a second pair of forks extending outwards from the cross member opposite and aligned with said first pair of forks.

2. A bicycle rack in accordance with claim 1 wherein the fixing means comprise a stake fixed to the cross member and extending downwards therefrom for engagement in a stake hole in a top surface of a respective one of the parallel truck box side walls.

3. A bicycle rack in accordance with claim 2 wherein each stake is adjustably fixed to the cross member.

4. A bicycle rack in accordance with claim 1 wherein the cross member includes beveled top and bottom edges extending longitudinally therealong.

5. A bicycle rack in accordance with claim 4 wherein the cross member includes padding extending along each beveled top edge.

6. A bicycle rack in accordance with claim 5 wherein the padding comprises a resilient rubber material.

7. A bicycle rack in accordance with claim 1 wherein the first and second pairs of forks comprise a pair of spaced apart elongate members fastened to the cross member, said elongate members being parallel and a having opposing engagement surfaces for engaging the bicycle wheel and bicycle frame.

8. A bicycle rack in accordance with claim 7 wherein the adjustment means comprise at least one pair of slots spaced apart and extending longitudinally along the cross member, a hole in each one of the at least one pair of elongate members arranged to cooperate with a respective one of the at least one pair of slots, and a removable and reengagable fastener for engaging through said cooperating holes and slots.

9. A bicycle rack in accordance with claim 7 wherein the pair of elongate members include adjustment means for adjusting at least one of said pair of elongate members longitudinally along the cross member to accommodate bicycles having wheels and frames of various sizes.

10. A bicycle rack in accordance with claim 9 wherein each pair of first forks includes padding on each engagement surface.

11. A bicycle rack in accordance with claim 10 wherein the padding is comprised of resilient rubber material.

12. A bicycle rack in accordance with claim 1 wherein the support means include a plurality of first slots, and a plurality of second slots.

13. A bicycle rack in accordance with claim 1 wherein the support means include a plurality of first pairs of forks, and a plurality of second pairs of forks.

14. A bicycle rack in accordance with claim 1 wherein the support means are spaced along the cross member and arranged with all of the first pairs of forks extending from the cross member in the same direction.

15. A bicycle rack in accordance with claim 1 wherein the support means are spaced along the cross member and arranged with adjacent first pairs of forks extending from the cross member in opposite directions.

16. A bicycle rack in accordance with claim 14 or 15 wherein the support means include three first pairs of forks, and three second pairs of forks.

17. A bicycle rack in accordance with claim 14 or 15 wherein the support means include five first pairs of forks, and five second pairs of forks.

* * * * *